US011340845B1

(12) United States Patent
Mcdaniel et al.

(10) Patent No.: US 11,340,845 B1
(45) Date of Patent: May 24, 2022

(54) DETERMINATION OF PREDICTED FAILURE MODES BASED ON PROPERTIES OF DUST IN PRINTING DEVICES

(71) Applicant: Hewlett-Packard Development Company, L.P., Spring, TX (US)

(72) Inventors: Gabriel Scott Mcdaniel, Boise, ID (US); Brian Christopher Mayer, Boise, ID (US); Jeffrey Harold Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/200,748

(22) Filed: Mar. 12, 2021

(51) Int. Cl.
*G06F 11/07* (2006.01)
*G06F 3/12* (2006.01)

(52) U.S. Cl.
CPC ............ *G06F 3/121* (2013.01); *G06F 3/1234* (2013.01)

(58) Field of Classification Search
CPC ... G06F 3/121; G06F 3/1234; H04N 1/00909; H04N 1/4097; H04N 5/2171
USPC ............. 358/1.9, 3.26, 1.13, 1.14, 504, 463; 399/11, 34, 98
See application file for complete search history.

(56) References Cited

U.S. PATENT DOCUMENTS 6,792,161 B1 * 9/2004 Imaizumi ............... G01N 21/94 358/463
7,355,193 B2 4/2008 Gann et al.
8,711,241 B2 4/2014 Kotani
2007/0158536 A1 * 7/2007 Gann ..................... G01N 21/94 250/234
2012/0143564 A1 6/2012 Li et al.
2015/0003847 A1 1/2015 Yang et al.

OTHER PUBLICATIONS

Kelly Brinsko-Beckert; "The Analysis of 3D Printer Dust for Forensic Applications"; Journal of Forensic Sciences; Jun. 22, 2020.

* cited by examiner

*Primary Examiner* — Jamares Q Washington
(74) *Attorney, Agent, or Firm* — Mannava & Kang

(57) ABSTRACT

According to examples, an apparatus may include a processor and a memory on which are stored computer-readable instructions that, when executed by the processor, may cause the processor to determine a property of dust based on information associated with the dust in a printing device. The processor may classify the dust according to the determined property of the dust and may determine a predicted failure mode associated with the dust classification. The processor may output an instruction associated with the predicted failure mode.

15 Claims, 5 Drawing Sheets

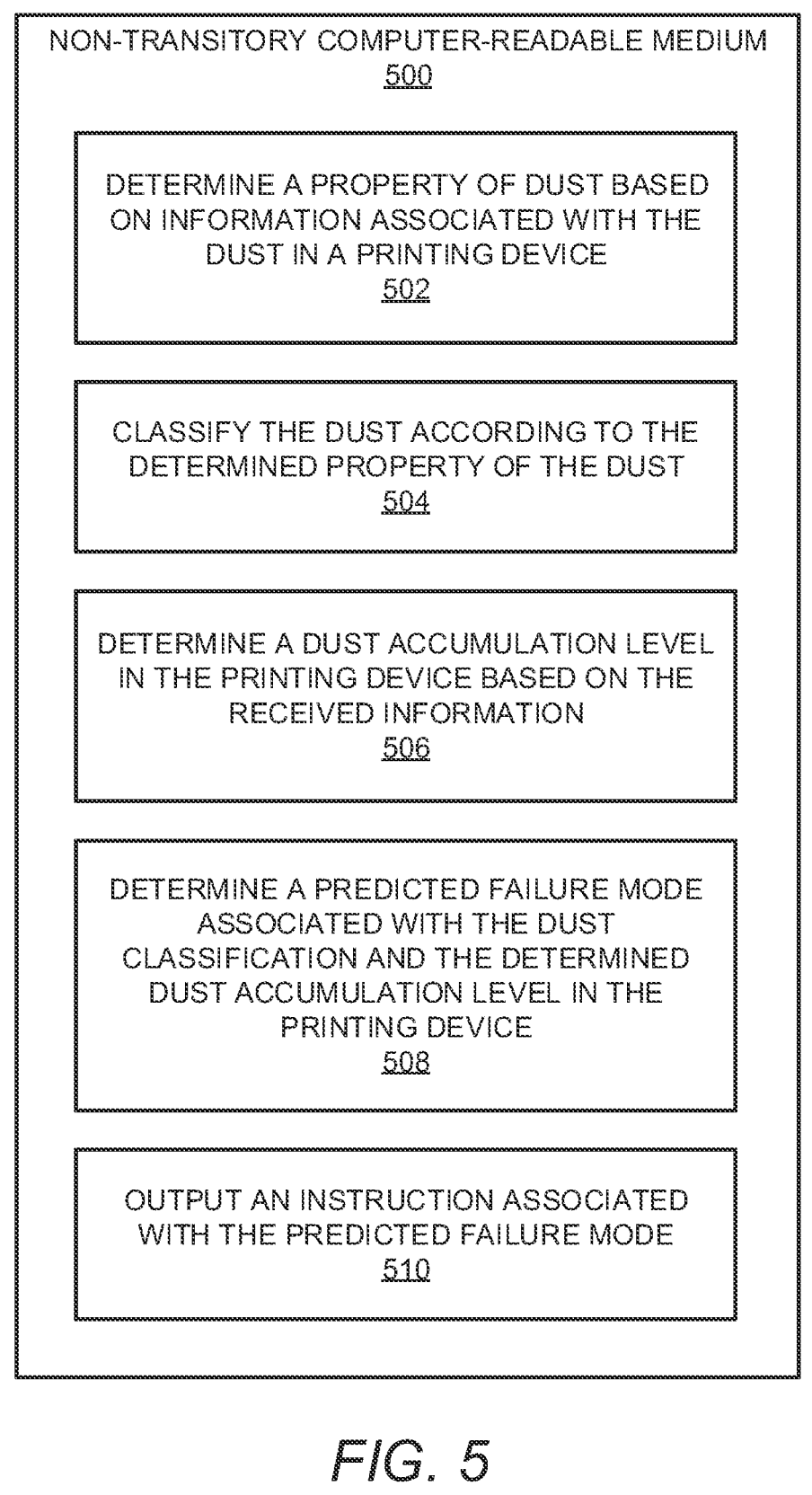

NON-TRANSITORY COMPUTER-READABLE MEDIUM
500

DETERMINE A PROPERTY OF DUST BASED ON INFORMATION ASSOCIATED WITH THE DUST IN A PRINTING DEVICE
502

CLASSIFY THE DUST ACCORDING TO THE DETERMINED PROPERTY OF THE DUST
504

DETERMINE A DUST ACCUMULATION LEVEL IN THE PRINTING DEVICE BASED ON THE RECEIVED INFORMATION
506

DETERMINE A PREDICTED FAILURE MODE ASSOCIATED WITH THE DUST CLASSIFICATION AND THE DETERMINED DUST ACCUMULATION LEVEL IN THE PRINTING DEVICE
508

OUTPUT AN INSTRUCTION ASSOCIATED WITH THE PREDICTED FAILURE MODE
510

FIG. 5

DETERMINATION OF PREDICTED FAILURE MODES BASED ON PROPERTIES OF DUST IN PRINTING DEVICES

BACKGROUND

Printers may be used to print images. Dust may accumulate on printer components, which may affect printer performance.

BRIEF DESCRIPTION OF THE DRAWINGS

Features of the present disclosure are illustrated by way of example and not limited in the following figure(s), in which like numerals indicate like elements, in which:

FIG. 5 depicts a block diagram of an example non-transitory computer-readable medium that may have stored thereon computer-readable instructions to determine a predicted failure mode of a printing device based on a dust classification and a dust accumulation level in the printing device.

DETAILED DESCRIPTION

Figure 1:
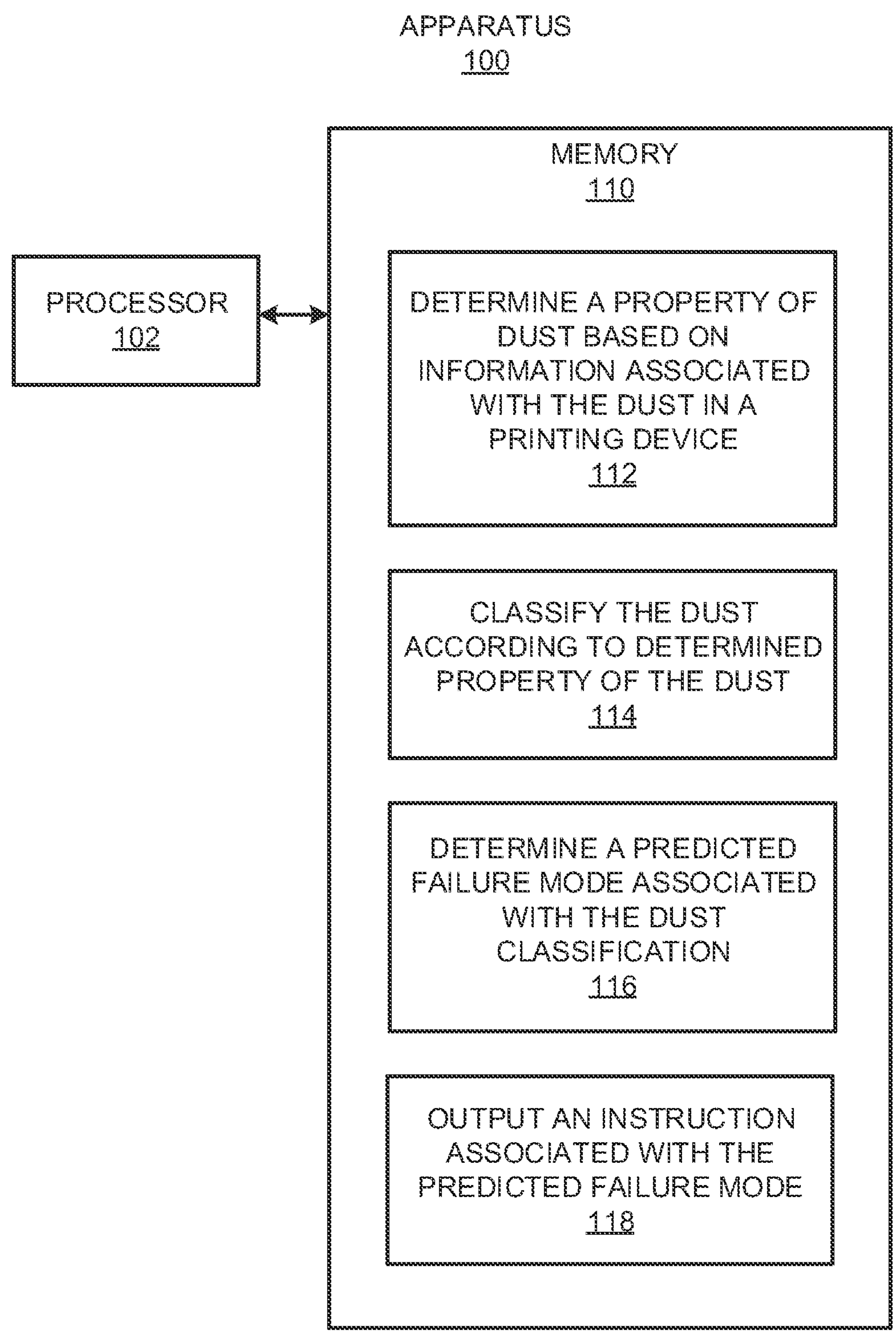
FIG. 1 depicts a block diagram of an example apparatus that may determine a predicted failure mode of a printing device based on a classified property of dust in the printing device.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The present disclosure pertains to detecting dust accumulation in printing devices and predicting failure modes based on the detected dust accumulation. Generally, dust accumulation may influence printing device performance and may cause various types of component failures. There are various types of dust that may accumulate in printing devices, such as, for example, environmental dust from soil, road dust, industrial dust, human and animal dust, and/or the like. Dust may also originate from within the printing device, such as from the paper used, the toner, part wear, and/or the like. Different geographical regions, such as desert regions, coastal regions, cities, rural regions, and/or the like, may produce different types of dust, which may be associated with different types of problems or failures. Different locations at which the printing device is installed, such as an outside loading dock, an inside office space, a home, and/or the like, may also produce different types and amounts of dust. In some examples, certain properties of the dust, together with accumulation levels, may correlate with different types of failures.

Disclosed herein are apparatuses, systems, methods, and computer-readable media for determining a property of dust and predicting a failure mode for printing devices based on the classified dust property. In some examples, a processor may determine the property of dust in a printing device based on sensed dust data and may determine a predicted failure mode associated with the dust based on the determined property of the dust. The processor may output an instruction associated with the predicted failure mode, for instance, an instruction including a message to output clean the printing device, to modify a component/consumable life, to optimize calibration and/or cleaning cycles, to generate wear models for parts correlated to the dust, and/or the like.

By enabling classification of dust properties, the prediction of part failures associated with dust accumulation may be improved. In some examples, the classification of dust properties may allow for a more accurate prediction of potentially defective components of printing devices, such as fuser rollers, pick rollers, and/or the like, thereby enabling efficient and accurate maintenance and servicing of the printers. This may also reduce downtime of the printers.

Figure 2:
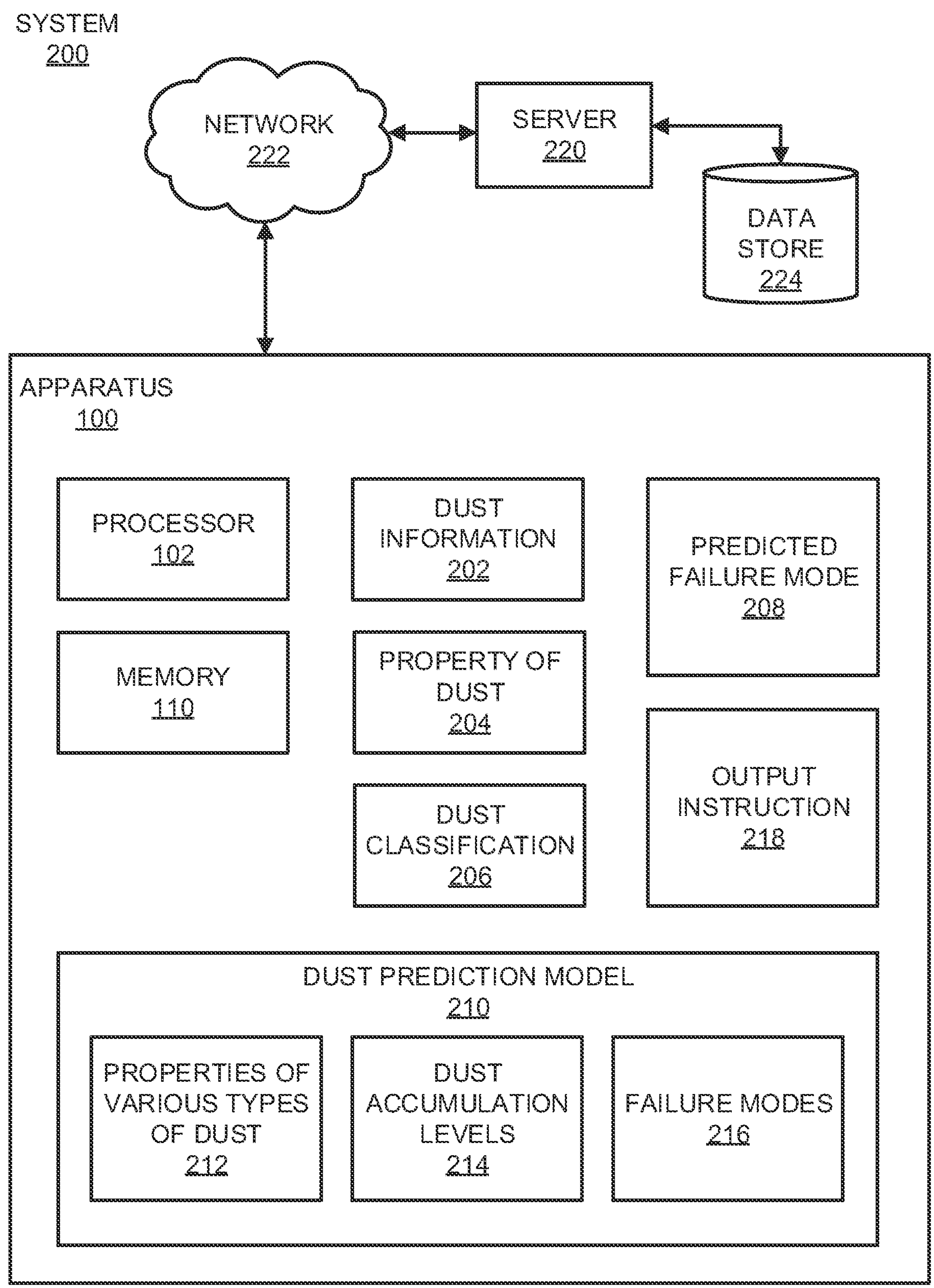
FIG. 2 shows a block diagram of an example system within which the example apparatus depicted in FIG. 1 may be implemented.
Figure 3:
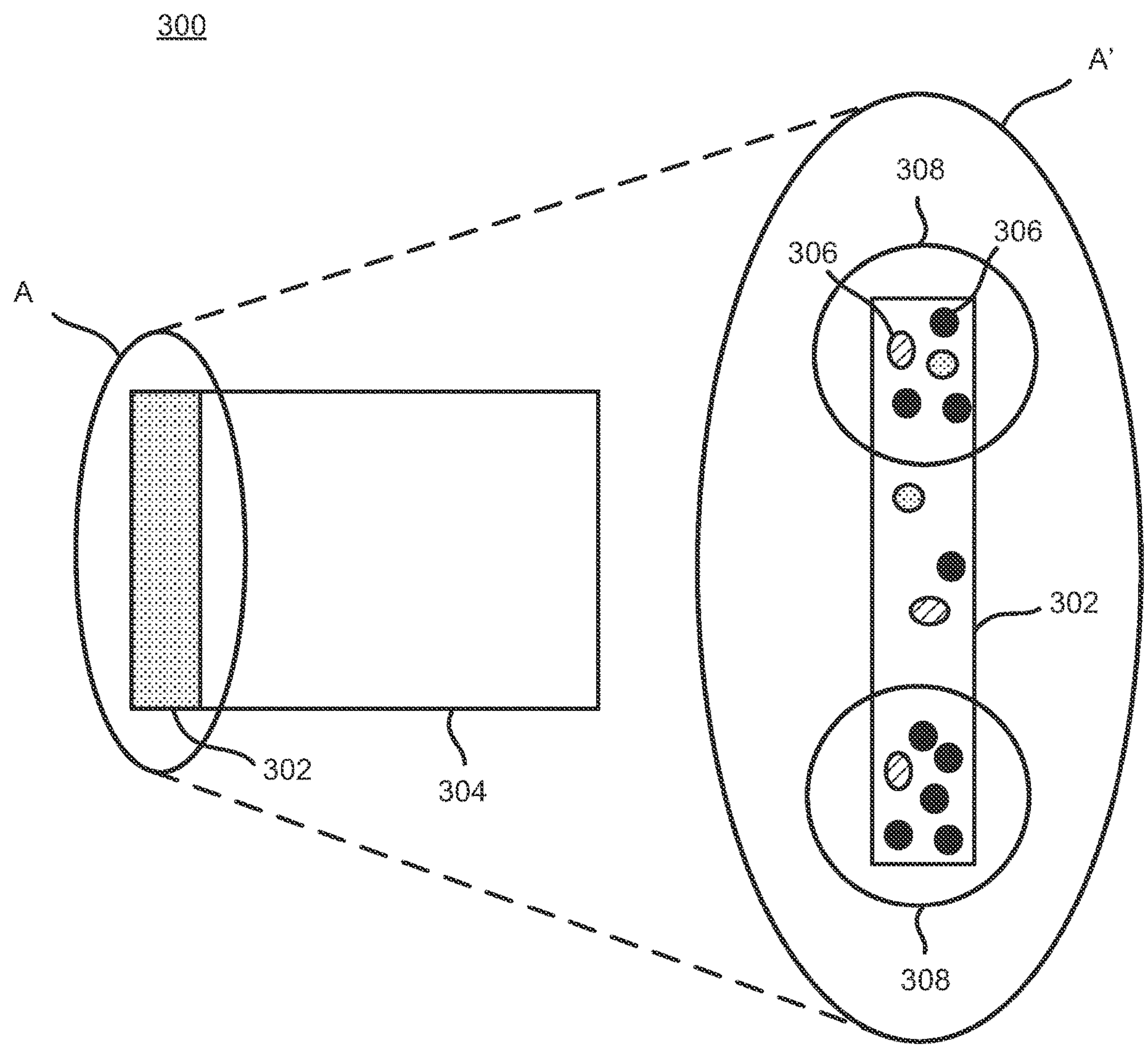
FIG. 3 shows a diagram of an example component of a printing device to sense dust accumulation.

Reference is first made to FIGS. 1, 2 and 3. FIG. 1 depicts a block diagram of an example apparatus that may determine a predicted failure mode of a printing device based on a property of dust in the printing device. FIG. 2 shows a block diagram of an example system within which the example apparatus depicted in FIG. 1 may be implemented. FIG. 3 is a diagram of an example component of a printing device to sense dust accumulation. It should be understood that the apparatus 100 depicted in FIG. 1, the system 200 depicted in FIG. 2, and the component of the printing device depicted in FIG. 3 may include additional features and that some of the features described herein may be removed and/or modified without departing from the scopes of the apparatus 100, the system 200, and the component 300.

The apparatus 100 may be implemented in a printing device, such as a laser printer, a photo printer, an inkjet printer, or the like, although in other examples the apparatus may be a computing device that is separate from a printing device. As shown, the apparatus 100 may include a processor 102 and a non-transitory computer-readable medium, e.g., a memory 110. The processor 102 may be a semiconductor-based microprocessor, a central processing unit (CPU), an application-specific integrated circuit (ASIC), a field-programmable gate array (FPGA), and/or other hardware devices. Although the apparatus 100 is depicted as having a single processor 102, it should be understood that the apparatus 100 may include additional processors and/or cores without departing from a scope of the apparatus 100 and/or system 200. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read-Only Memory (ROM), flash memory, solid-state drive, Random Access memory (RAM), an Electrically Erasable Programmable Read-Only Memory (EEPROM), a storage device, an optical disc, or the like. In some examples, the memory 110 may be integrated in the processor 102, which may contain or store executable instructions, for instance, in an ASIC. The memory 110 may be a non-transitory computer-readable medium. The term "non-transitory" does not encompass transitory propagating signals.

As shown in FIG. 1, the processor 102 may execute instructions 112-118 to determine a predicted failure mode of a printing device based on a property of dust in the printing device. The instructions 112-118 may be computer-readable instructions, e.g., non-transitory computer-readable instructions. In other examples, the apparatus 100 may include hardware logic blocks or a combination of instructions and hardware logic blocks to implement or execute functions corresponding to the instructions 112-118.

The processor 102 may fetch, decode, and execute the instructions 112 to determine a property 204 of dust 306 based on dust information 202 associated with the dust 306 in a printing device. The dust information 202 may include characteristics of the dust in the printing device. The dust information 202 may be received from the printing device, retrieved from the memory 110, and/or the like.

In some examples, the dust information 202 may include information from sensors installed in the printing device. The sensors may include optical sensors, capacitive sensors, and/or the like, which may be capable of sensing characteristics of the dust in the printing device. By way of particular example and for purposes of illustration, a scanner, e.g., component 300 depicted in FIG. 3, in the printing device may be used as a sensor to detect characteristics of dust inside the printing device. As depicted in FIG. 3, the scanner 300 may include a scan bar 302 and a scanner bed 304. The scan bar 302 may capture an image of the dust 306 which may have accumulated on a surface of the scan bar 302. In some examples, the dust 306 may be comprised of any of a plurality of different types of dust, which may be produced from different sources and having different properties.

In some examples, the scan bar 302 may generate signals that may provide information on the amplitude and distribution of the dust 306, which may be used to identify a region 308 of relatively high dust concentration. For instance, based on the signals received from the scan bar 302, the processor 102 may generate the dust information 202 to include an amount, e.g., a density, a concentration, or the like, of the dust, a location of the dust, a distribution of the dust, relative concentrations of the dust, particle sizes of the dust, electromagnetic radiation information of the dust, and/or the like. For instance, in the visible spectrum, the electromagnetic radiation information may include color information associated with the dust 306.

The processor 102 may fetch, decode, and execute the instructions 114 to classify the dust 306 according to the determined property 204 of the dust 306. The processor 102 may determine the dust classification 206 according to the property 204 of the dust 306 as identified in the dust information 202. In some examples, the processor 102 may correlate the property 204 of the dust 306 with a type of dust, and may determine a source of the dust 306, a material of the dust 306, and/or the like based on the determined property 204 of the dust 306.

By way of particular example and for purposes of illustration, the processor 102 may determine that a property 204 of the dust 306 correlates to a particular dust type, such as paper dust, and may correlate the property 204 with a dust classification 206 for paper dust. For instance, dust may originate from different sources, such as different types of paper used in the printing device, components of the printing device such as rollers or toners, atmospheric conditions in which the printing device is located such as pollen, and/or the like, each of which may have different properties. In this regard, the use of paper having a relatively high talc content may result in dust that may return a relatively brighter color signal from the sensor 302. In some examples, the processor 102 may determine the dust classification 206 of the property 204 of the dust 306 based on regional dust data, seasonal dust data, local device dust data such as from sensors, user dust data such as user location or media types used, and/or the like.

The processor 102 may fetch, decode, and execute the instructions 116 to determine a predicted failure mode 208 associated with the dust classification 206. In some examples, the processor 102 may determine a dust accumulation level in the printing device based on the dust information 202. The processor 102 may correlate the dust classification 206 with the predicted failure mode 208 based on the property 204 of the dust 306 and the dust accumulation level from the dust information 202. For instance, a certain type of dust may have abrasive qualities which may impact a particular component in a certain manner. The processor 102 may determine the predicted failure mode 208 associated with the dust classification 206 based on the characteristics of the dust 306 included in the dust information 202.

By way of particular example and for purposes of illustration, the processor 102 may determine that the dust 306 in the printing device has a certain accumulation pattern on a component of the printing device. For instance, the processor 102 may identify dust accumulation at the edges of the scanner bar 302 as depicted by region 308 in FIG. 3. The processor 102 may also identify different properties of the dust 306 such as a particle size and/or a color. Based on such information about the dust 306, the processor 102 may classify the dust 306 as a type of dust, e.g., paper dust. In this particular example, the processor 102 may determine the predicted failure mode 208 to be a premature failure of a pick roller in the printing device, for instance. In some examples, the processor 102 may predict a wear pattern of various components of the printing device based on the dust classification 206 and an accumulation level of the particular type of dust. For instance, the dust characteristics may be consistent with a wear model that shortens the life of a component from a design target.

In some examples, the processor 102 may generate a dust prediction model 210, which may include properties 212 of various types of dust, accumulation levels 214, and failure modes 216. The dust prediction model 210 may include historical dust information from the printing device and/or dust information collected from a plurality of printing devices over a period of time. The dust prediction model 210 may correlate different failure modes 216 with the properties 212 of various types of dust and the dust accumulation levels 214. In some examples, the processor 102 may use the dust prediction model 210 to determine the predicted failure mode 208 for the printing device. For instance, the predicted failure mode 208 for the printing device may be selected among the failure modes 216 found in the dust prediction model 210.

The processor 102 may train the dust prediction model 210 based on sample dust information received from multiple printing devices over a period of time. In some examples, the processor 102 may classify sample dust information according to the properties 212 of various types of dust and may correlate failure modes 216 with the classified properties 212 of various types of dust and the dust accumulation levels 214. The processor 102 may determine the property 204 of the dust in the printing device among the classified properties 212 of various types of dust. The processor 102 may update the dust prediction model 210 over time using information received from the printing devices, for instance, by using machine learning. For instance, the processor 102 may track a result of a recommended action in the printing devices, such as whether a recommended action, or lack of a recommended action, results in prevention, alternation, or no change in components and associated the failure modes 216. The processor 102 may use the tracked results to update and/or fine tune the dust prediction model 210. In some examples, the processor 102 may correlate the failure modes 216 using various types of data, including local device dust data, regional dust data, seasonal dust data, user dust data, and/or the like.

The processor 102 may fetch, decode, and execute the instructions 118 to output an instruction 218 associated with the predicted failure mode 208. In some examples, the output instruction 218 may be a message to the user regarding the predicted failure mode 208, an instruction to update a setting or device information, and/or the like. For instance, the processor 102 may generate a message to clean the printing device, generate a message to replace a component of the printing device, modify a life span of the component of the printing device, generate a wear model for the component of the printing device correlated to the property of the dust, update calibration information of the printing device, update cleaning cycle information, and/or the like.

In some examples, the dust prediction model 210 may be implemented in a cloud computing environment. As depicted in FIG. 2, the system 200 may include a server 220 or a plurality of servers 220 with which the apparatus 100 may be in communication via a network 222. The server 220 may be connected to a data store 224. The server 220 may receive sample dust information from multiple printing devices via the network 222, and may generate the dust prediction model 210 based on the sample dust information. The server 220 may classify the sample dust information according to the properties 212 of various types of dust, and may correlate the failure modes 216 with the properties 212 of various types of dust and the dust accumulation levels 214. In some examples, the server 220 may store the dust prediction model 210 in the data store 224, and may upload the dust prediction model 210 to the apparatus 100. The apparatus 100 may receive the dust information 202 from a remote printing device via the network 222, determine the dust classification 206, and determine the predicted failure mode 208 for the remote printing device. In this example, the apparatus 100 may output the instruction 218 to the remote printing device via the network 222 to cause the remote printing device to perform automated actions, generate messages to the user regarding the predicted failure mode 208, initiate service events, and/or the like.

Figure 4:
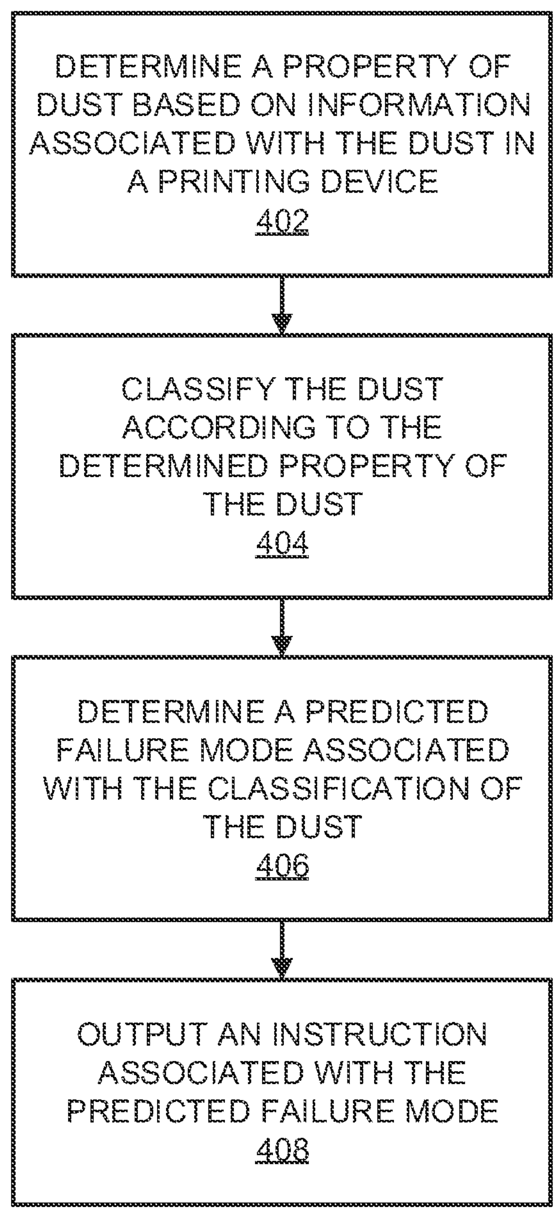
FIG. 4 shows a flow diagram of an example method for determining a predicted failure mode of a printing device based on a classified property of dust in the printing device.

Various manners in which the processor 102 may operate are discussed in greater detail with respect to the method 400 depicted in FIG. 4. FIG. 4 depicts a flow diagram of an example method for determining a predicted failure mode 208 of a printing device based on a classified property 204 of dust 306 in the printing device. It should be understood that the method 400 depicted in FIG. 4 may include additional operations and that some of the operations described therein may be removed and/or modified without departing from the scope of the method 400. The description of the method 400 is made with reference to the features depicted in FIGS. 1, 2, and 3 for purposes of illustration.

At block 402, the processor 102 may determine the property 204 of dust 306 based on dust information 202 associated with the dust 306 in the printing device. In some examples, the processor 102 may identify a source of the dust 306, a material of the dust 306, and/or the like, based on the determined property 204 of the dust 306.

At block 404, the processor 102 may classify the dust 306 according to the determined property 204 of the dust 306. The dust classification 206 may be based on a characteristic of the dust 306 as described in the dust information 202. The characteristic of the dust 306 may include an amount of the dust, a location of the dust, a distribution of the dust, relative concentrations of the dust, particle sizes of the dust, electromagnetic radiation information of the dust such as color information, and/or the like.

At block 406, the processor 102 may determine the predicted failure mode 208 associated with the classification of the dust 306. The processor 102 may determine a dust accumulation level in the printing device based on the dust information 202 and may determine the predicted failure mode 208 based on the property 204 of the dust 306 and the determined dust accumulation level in the printing device.

In some examples, the processor 102 may classify sample dust information according to properties 212 of various types of dust, and may correlate failure modes 216 with the classified properties 212 of various types of dust and dust accumulation levels 214. The processor 102 may determine the property 204 of the dust 306 in the printing device among the classified properties 212 of various types of dust. In some examples, the processor 102 may correlate the failure modes 216 with the classified properties 212 of various types of dust and the dust accumulation levels 214 based on local device dust data, regional dust data, seasonal dust data, user dust data, and/or the like.

At block 408, the processor 102 may output an instruction 218 associated with the predicted failure mode 208. In some examples, the processor 102 may generate a message to clean the printing device, generate a message to replace a component of the printing device, modify a life span of the component of the printing device, generate a wear model for the component of the printing device correlated to the property 204 of the dust 306, update calibration information, update cleaning cycle information, and/or the like.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 5, there is shown a block diagram of a non-transitory computer-readable medium 500 that may have stored thereon computer-readable instructions to determine a predicted failure mode of a printing device based on a dust classification and a dust accumulation level in the printing device. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium. The term "non-transitory" does not encompass transitory propagating signals.

The computer-readable medium 500 may have stored thereon computer-readable instructions 502-510 that a processor, such as the processor 102 depicted in FIGS. 1-2, may execute. The computer-readable medium 500 may be an electronic, magnetic, optical, or other physical storage device that contains or stores executable instructions. The computer-readable medium 500 may be, for example, Random-Access memory (RAM), an Electrically Erasable Programmable Read-Only Memory (EEPROM), a storage device, an optical disc, or the like.

The processor may fetch, decode, and execute the instructions 502 to determine a property 204 of dust 306 based on dust information 202 associated with the dust 306 in a printing device. In some examples, the dust information 202 may be received from a sensor, such as an optical scanner, implemented in the printing device.

The processor may fetch, decode, and execute the instructions 504 to classify the dust 306 to generate the dust classification 206 according to the determined property 204 of the dust 306. In some examples, the dust classification 206 may be associated with a type of dust.

The processor may fetch, decode, and execute the instructions 506 to determine a dust accumulation level in the printing device based on the dust information 202. The processor may fetch, decode, and execute the instructions 508 to determine a predicted failure mode 208 associated with the dust classification 206 and the determined dust accumulation level in the printing device.

The processor may fetch, decode, and execute the instructions 510 to output an instruction 218 associated with the predicted failure mode 208. The output instruction 218 may be a message to the user regarding the predicted failure mode 208, an instruction to perform an automated action based on the predicted failure mode 208, and/or the like.

In some examples, the property 204 of the dust 306 may be associated with a source of the dust, a material of the dust, and/or the like. The processor may classify the dust 306 according to the determined property 204 of the dust 306 based on a characteristic of the dust 306 in the printing device. The characteristic of the dust 306 may include an amount of the dust, a location of the dust, a distribution of the dust, relative concentrations of the dust, particle sizes of the dust, electromagnetic radiation information of the dust such as color information, and/or the like.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:

a processor; and a memory on which are stored machine-readable instructions that when executed by the processor, cause the processor to:

determine a property of dust based on information associated with the dust in a printing device;

classify the dust according to the determined property of the dust;

determine a dust accumulation level in the printing device based on the information;

determine a predicted failure mode associated with the dust classification based on the determined property of dust and the determined dust accumulation level in the printing device; and output an instruction associated with the predicted failure mode.

2. The apparatus of claim 1, wherein the instructions cause the processor to:

determine a source of the dust and/or a material of the dust based on the determined property of the dust.

3. The apparatus of claim 1, wherein the instructions cause the processor to:

classify the dust according to the property of the dust based on a characteristic of the dust in the information, the characteristic of the dust comprising an amount of the dust, a location of the dust, a distribution of the dust, relative concentrations of the dust, particle sizes of the dust, and/or electromagnetic radiation information of the dust.

4. The apparatus of claim 1, wherein the instructions cause the processor to:

correlate failure modes with classified properties of various types of dust and dust accumulation levels, wherein the property of the dust in the printing device is determined among the classified properties of various types of dust.

5. The apparatus of claim 4, wherein the instructions cause the processor to:

correlate the failure modes with the classified properties of various types dust and the dust accumulation levels based on local device dust data, regional dust data, seasonal dust data, and/or user dust data.

6. The apparatus of claim 1, wherein, based on the predicted failure mode, the instructions cause the processor to:

generate a message to clean the printing device;

generate a message to replace a component of the printing device;

modify a life span of the component of the printing device;

generate a wear model for the component of the printing device correlated to the property of the dust;

update calibration information; and/or update cleaning cycle information.

7. A method comprising:

classifying, by a processor, sample dust information according to properties of various types of dust; and correlating, by the processor, failure modes with the classified properties of various types of dust and dust accumulation levels, wherein the property of the dust in a printing device is determined among the classified properties of various types of dust;

determining, by the processor, a property of dust of the printing device among the classified properties of various types of dust based on information associated with the dust in the printing device, a source of the dust and/or a material of the dust being identifiable based on the determined property of the dust;

classifying, by the processor, the dust according to the determined property of the dust;

determining, by the processor, a predicted failure mode associated with the classification of the dust; and outputting, by the processor, an instruction associated with the predicted failure mode.

8. The method of claim 7, further comprising:

classifying the dust according to the property of the dust based on a characteristic of the dust in the information, the characteristic of the dust comprising an amount of the dust, a location of the dust, a distribution of the dust, relative concentrations of the dust, particle sizes of the dust, and/or electromagnetic radiation information of the dust.

9. The method of claim 7, further comprising:

determining a dust accumulation level in the printing device based on the information; and determining the predicted failure mode based on the property of the dust and the determined dust accumulation level in the printing device.

10. The method of claim 7, further comprising:

correlating the failure modes with the classified properties of various types of dust and the dust accumulation levels based on local device dust data, regional dust data, seasonal dust data, and/or user dust data.

11. The method of claim 7, wherein outputting the instruction further comprises:

generating a message to clean the printing device;

generating a message to replace a component of the printing device;

modifying a life span of the component of the printing device;

generating a wear model for the component of the printing device correlated to the property of the dust;

updating calibration information; and/or updating cleaning cycle information.

12. A non-transitory computer-readable medium on which is stored machine-readable instructions that, when executed by a processor, cause the processor to:

determine a property of dust based on information associated with the dust in a printing device;

classify the dust according to the determined property of the dust;

determine a dust accumulation level in the printing device based on the information;

determine a predicted failure mode associated with the dust classification based on the determined property of the dust and the determined dust accumulation level in the printing device; and output an instruction associated with the predicted failure mode.

13. The computer-readable medium of claim 12, wherein the determined property of the dust is associated with a source of the dust and/or a material of the dust, and wherein the instructions cause the processor to:

classify the dust according to the determined property of the dust based a characteristic of the dust in the printing device, the characteristic of the dust comprising an amount of the dust, a location of the dust, a distribution of the dust, relative concentrations of the dust, particle sizes of the dust, and/or electromagnetic radiation information of the dust.

14. The computer-readable medium of claim 12, wherein the instructions cause the processor to:

classify sample dust information according to properties of various types of dust; and correlate failure modes with the classified properties of various types of dust and dust accumulation levels, wherein the property of the dust in the printing device is determined among the classified properties of various types of dust.

15. The apparatus of claim 1, wherein the instructions cause the processor to:

predict a premature failure of a component of the printing device based on the determined predicted failure mode.

* * * * *